US012756179B2

(12) United States Patent
Kloo et al.

(10) Patent No.: US 12,756,179 B2
(45) Date of Patent: Oct. 6, 2026

(54) SYSTEMS AND METHODS FOR REMOTELY SERVICING AN ELECTRIC CHARGING APPARATUS

(71) Applicant: Ampup, Inc., Santa Clara, CA (US)

(72) Inventors: Lennart Earl Kloo, Wethersfield, CT (US); Thomas Shaofeng Sun, Cupertino, CA (US)

(73) Assignee: Ampup, Inc., Santa Clara, CA (US)

( * ) Notice: Subject to any disclaimer, the term of this patent is extended or adjusted under 35 U.S.C. 154(b) by 154 days.

(21) Appl. No.: 18/938,548

(22) Filed: Nov. 6, 2024

(65) Prior Publication Data

US 2025/0149879 A1 May 8, 2025

Related U.S. Application Data

(60) Provisional application No. 63/596,824, filed on Nov. 7, 2023.

(51) Int. Cl.
*H02H 7/20* (2006.01)
*B60L 53/62* (2019.01)
*B60L 53/68* (2019.01)

(52) U.S. Cl.
CPC ............... *H02H 7/20* (2013.01); *B60L 53/62* (2019.02); *B60L 53/68* (2019.02)

(58) Field of Classification Search
CPC ........ B60L 53/305; B60L 53/62; B60L 53/68; H02H 1/0061; H02H 1/0092; H02H 3/06; H02H 3/08; H02H 7/20
USPC .......................................................... 361/71
See application file for complete search history.

(56) References Cited

U.S. PATENT DOCUMENTS

| | | | |
|---|---|---|---|
| 8,523,576 B2 | 9/2013 | Heien et al. | |
| 9,090,169 B2 | 7/2015 | Ang et al. | |
| 9,168,822 B2 | 10/2015 | Ichikawa et al. | |
| 9,227,519 B2 | 1/2016 | Heuer et al. | |
| 9,434,268 B2 | 9/2016 | DeBoer et al. | |
| 9,669,719 B1 | 6/2017 | Gerber et al. | |
| 9,889,758 B2 | 2/2018 | Ueo | |
| 10,654,370 B2 | 5/2020 | Namuduri et al. | |
| 11,850,958 B2 | 12/2023 | Gorantla Narayana Murthy | |
| 2011/0037429 A1* | 2/2011 | DeBoer .................. | B60L 53/14 320/109 |

(Continued)

*Primary Examiner* — Kevin J Comber

(57) ABSTRACT

Inventions described include systems and methods for remotely servicing an electric charger. System components can include: a remote-controlled disconnect switch including a contactor configured to prevent the electric charger from losing power; a safety subsystem including a manual disconnect switch coupled to the remote-controlled disconnect switch; a set of lines coupling the remote-controlled disconnect switch to an interface and the manual disconnect switch; an indication subsystem; and optionally, an enclosure/housing. The systems and methods function to provide a safe and secure mechanism for remotely communicating with, accessing, manipulating, testing, servicing, and/or modulating operation of an associated charger. The system 100 thus provides a mechanism for reducing, minimizing, or otherwise eliminating downtime for an associated charger, in order to rapidly address issues for users, in relation to hardware faults, software faults, internet connectivity issues, and/or other issues involved in a charging session.

20 Claims, 6 Drawing Sheets

(56) References Cited

U.S. PATENT DOCUMENTS

| | | | | |
|---|---|---|---|---|
| 2012/0309455 | A1* | 12/2012 | Klose | B60L 53/68 455/557 |
| 2016/0318398 | A1 | 11/2016 | Ayala | |
| 2017/0008413 | A1* | 1/2017 | Reineccius | H02J 3/14 |
| 2021/0098988 | A1* | 4/2021 | Gokhale | H02J 3/008 |
| 2023/0294536 | A1* | 9/2023 | Simmons | B60L 53/66 320/109 |

* cited by examiner

SYSTEMS AND METHODS FOR REMOTELY SERVICING AN ELECTRIC CHARGING APPARATUS

CROSS-REFERENCE TO RELATED APPLICATIONS

This application claims the benefit of U.S. Provisional Application No. 63/596,824, filed on Nov. 7, 2023, which is incorporated in its entirety herein by this reference.

TECHNICAL FIELD

The disclosure generally relates to fields pertaining to charging of electric vehicles and other electric apparatuses.

BACKGROUND

Traditional electric vehicle service equipment (EVSE) units (e.g., chargers) typically rely upon connected/online operations, in order to operate smoothly with respect to initiating and/or completing charging sessions. However, flaws inherent to locations of EVSE unit installation can produce operational inefficiencies and poor user experiences, associated with poor connectivity and other factors. EVSE units that are positioned far away from entities of a platform for managing and maintaining such EVSE units typically require additional effort to service, which can result in prolonged downtime(s) for the associated EVSE unit(s), if there are any issues with operation.

Thus, there is a need in the field of electric charging for improved systems and methods for providing reliable, robust, and secure charging, while minimizing EVSE equipment downtime.

INCORPORATION BY REFERENCE

Figure 1:
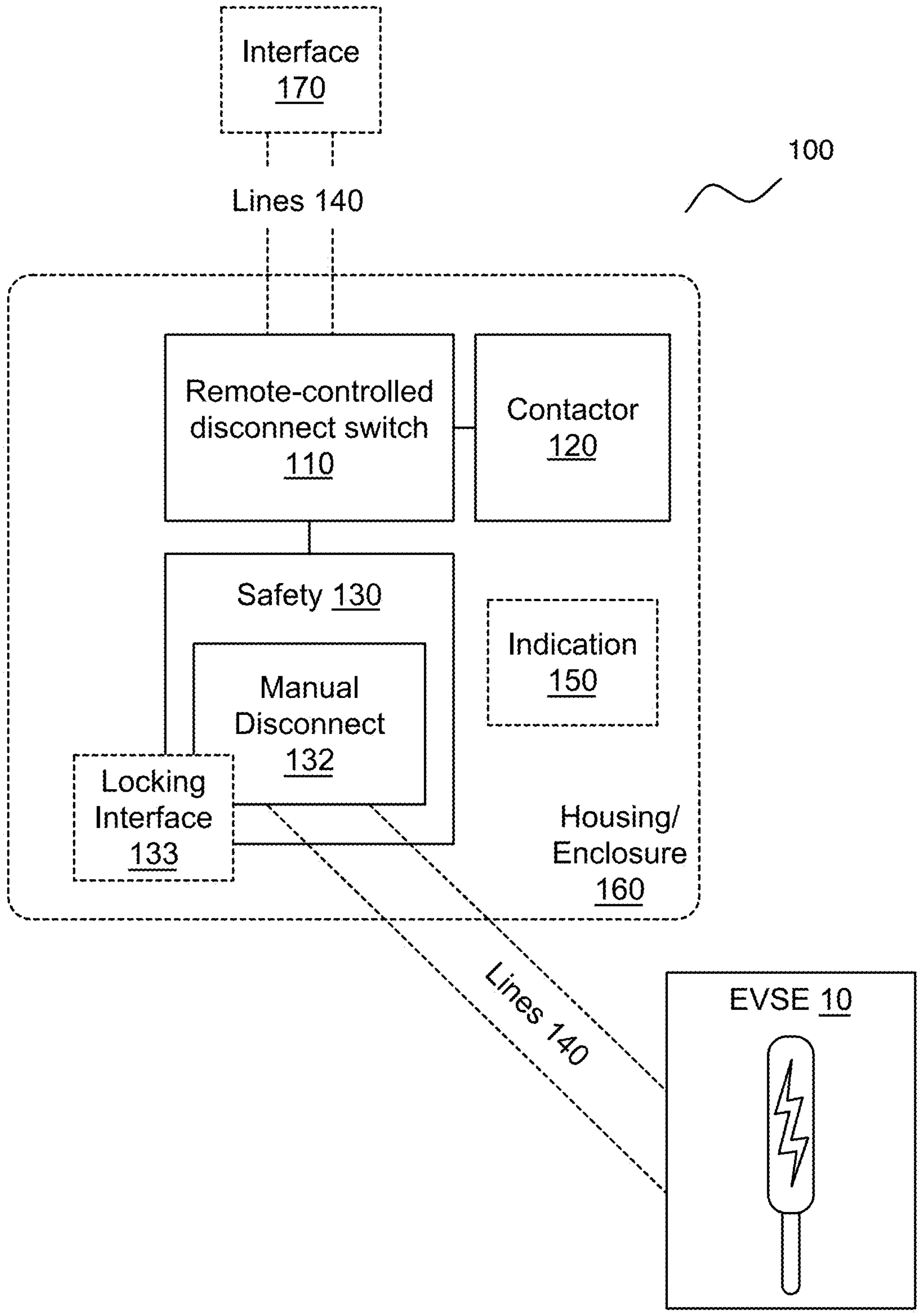
FIG. 1 depicts a schematic of an embodiment for remotely servicing a charger or other apparatus.

All publications, patents, and patent applications mentioned in this specification are herein incorporated by reference in their entireties for all purposes and to the same extent as if each individual publication, patent, or patent application was specifically and individually indicated to be incorporated by reference.

Furthermore, where a range of values is provided, it is understood that each intervening value, between the upper and lower limit of that range and any other stated or intervening value in that stated range is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either both of those included limits are also included in the invention.

DESCRIPTION OF THE EMBODIMENTS

The following description of the embodiments (e.g., including variations of embodiments, examples of embodiments, specific examples of embodiments, other suitable variants, etc.) is not intended to be limited to these embodiments, but rather to enable any person skilled in the art to make and use the invention(s).

1. BENEFITS AND APPLICATIONS

The invention(s) described can confer several benefits over conventional systems and methods.

For instance, the invention(s) provide a mechanism for remotely testing, servicing, and/or monitoring electric chargers/electric vehicle supply equipment (EVSE) units (e.g., electric vehicle chargers) that are experiencing issues, or are anticipated to experience issues.

The invention(s) thus include hardware and software architecture for remotely testing, servicing, and/or monitoring electric chargers/EVSE units, with inclusion of safety features, security features, and other architecture that provides suitable performance.

In one exemplary case, the invention(s) can provide solutions to maintenance entities of a platform for maintaining operation of communities of electric chargers and/or a platform for facilitating charging sessions for end-users, by allowing such maintenance entities to efficiently test, troubleshoot, power cycle, and/or perform other services for chargers that are experiencing issues or are otherwise anticipated to experience issues (e.g., based upon detected fault states). In particular, the invention(s) can provide situations for returning a charger to an operational state (e.g., through power cycling), if the charger is in a fault state where a hard reset will not suffice. In variations, the maintenance entities can include humans. In variations, the maintenance entities can include automated systems (e.g., including computing architecture) for maintaining chargers.

As such, the invention(s) provide efficient solutions for chargers that are or can produce issues for users, in relation to hardware faults, internet connectivity issues, and/or other issues. These issues may cause inconvenience and reduce the effectiveness of the charging process.

The invention(s) include fail safe systems configured to allow an associated charger to remain energized if the remote-access system loses connectivity. Furthermore, if the system loses connectivity during a service operation (e.g., power cycle operation), the system will automatically re-energize the charger to prevent undesired charger states.

The invention(s) also support maintenance of optimization of energy output/use and load management for a set of chargers/EVSE units at a site, by reducing or eliminating downtime for chargers that are experiencing issues. As such, the invention(s) provide solutions that support broader charging infrastructure adoption and while supporting high performance of utility demand response programs by site and/or charger managers.

The invention(s) also include architecture for generation of training and test data, for training of models, in various phases, to optimize control of load distribution and shedding in response to a wide range of demand events, and/or in relation to faulty charger modes.

The invention(s) also support green initiatives, with respect to demand shedding, adoption of clean electricity sources, and implementation of protocols to promote use of clean electricity and improved user behaviors to reduce carbon emissions.

The invention(s) can additionally or alternatively include electronic elements with associated software and/or firmware architecture for prevention of hacking and/or forms of cyber attacks against utilities companies and infrastructures.

The invention(s) can additionally or alternatively provide other suitable benefits.

Methods and systems described can additionally or alternatively be implemented and/or integrated with embodiments, variations, and examples of invention(s) described in U.S. application Ser. No. 16/983,175, which is herein incorporated in its entirety by this reference.

2. SYSTEM

Figure 2A:
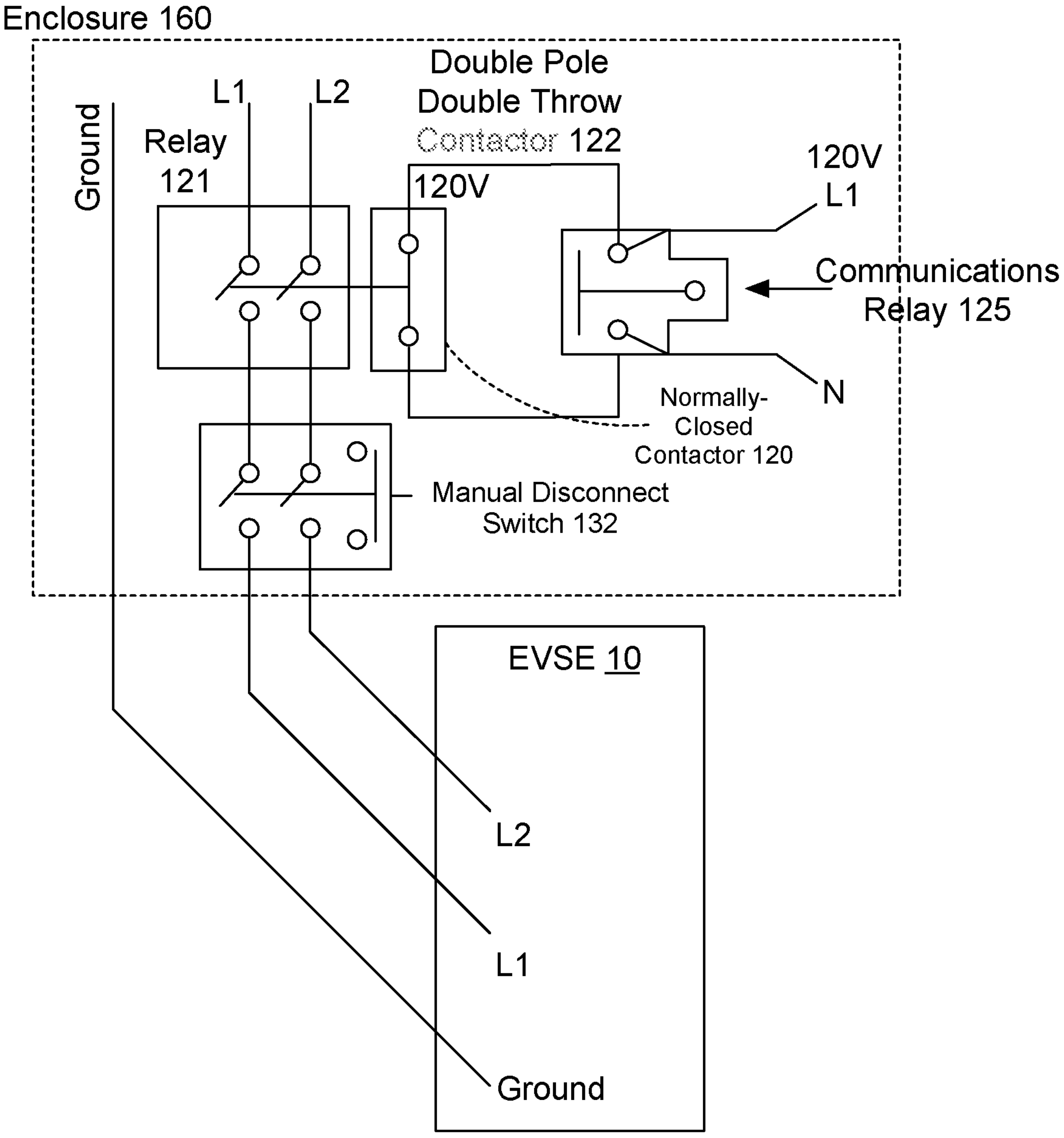
FIG. 2A depicts an example of a system for remotely servicing a charger or other apparatus.

As shown in FIGS. 1 and 2A, an embodiment of a system 100 for remotely servicing an electric charger 10 includes: a remote-controlled disconnect switch 110 including a contactor 120 configured to prevent the electric charger 10 from losing power; a safety subsystem 130 including a manual disconnect switch 132 coupled to the remote-controlled disconnect switch 110; a set of lines 140 coupling the remote-controlled disconnect switch 110 to an interface and the manual disconnect switch 130 to the electric charger 10; an indication subsystem 150; and optionally, an enclosure/housing 160 for the remote-controlled disconnect switch 110, the manual disconnect switch 130, and the indication subsystem 150.

The system 100 functions to provide a safe and secure mechanism for remotely communicating with, accessing, manipulating, testing, servicing, and/or modulating operation of an associated charger/EVSE unit. The system 100 thus provides a mechanism for reducing, minimizing, or otherwise eliminating downtime for an associated charger/EVSE unit, in order to rapidly address issues for users, in relation to hardware faults, software faults, internet connectivity issues, and/or other issues involved in a charging session.

The system 100 satisfies code and regulatory requirements for charging systems, including electric vehicle chargers.

The system 100 can be configured to execute or enable performance of embodiments, variations, and examples of the method 200 described in Section 3 below. The system 100 can alternatively support other methods, in relation to remotely communicating with, accessing, manipulating, testing, servicing, and/or modulating operation of an associated charger/EVSE unit.

Aspects of the system 100 are described in more detail below. Variations of the system 100 can be used to remotely access and manipulate operational states of other electrical apparatus, without need for on-site maintenance personnel (e.g., at the physical location of the electrical apparatus).

2.1 System-Remotely-Controllable Disconnect

As shown in FIGS. 1 and 2A, embodiments, variations, and examples of the system 100 can include a remote-controlled disconnect switch 110 including a contactor 120 configured to prevent the electric charger 10 from losing power. The remote-controlled disconnect switch 110 functions to provide a mechanism to remotely access and manipulate the charger 10 without need for an on-site maintenance entity (e.g., at the physical location of the electrical apparatus).

As shown in FIG. 2A, the remote-controlled disconnect switch 110 includes a relay 121 coupled to a subset of the set of lines (L1 and L2 in FIG. 2A) to an interface, where the relay 121 is coupled to the contactor 120 for high-power applications, such as charging of electric vehicles and/or other apparatuses.

The contactor 120 is structured to be normally-closed, in order to prevent the charger 10 from losing power (e.g., in the event communications with the remote-controlled disconnect switch 110 are interrupted or broken). In the event communications with the remote-controlled disconnect switch 110 are interrupted or broken, the normally-closed contactor 120 would return to the normally-closed state (e.g., return from an open state to a closed state), such that the charger 10 does not lose power and may continue to execute a charging session or operate in a safe state. As such, the contactor is structurally configured to return from an open state to a closed state in response to interrupted or broken connections with the remote-controlled disconnect switch.

As shown in FIG. 2A, the contactor 120 (e.g., first contactor) is coupled to a second contactor 122, which functions to support the ability of the system 100 to allow for use of lower voltages and/or transmitted currents to power cycle or otherwise manipulate the charger 10. The second contactor 122 can be a multi-pole and/or multi-throw contactor. The number of poles defines the number of individual circuits that the remote-controlled disconnect switch 110 can control. As such, the second contactor 122 provides control over transitioning the remote-controlled disconnect switch 110 between a low voltage circuit, a high voltage circuit, a power cycling circuit, and/or other circuitry. The number of throws defines the number of positions of the contactor 122 that can be controlled by the remote-controlled disconnect switch 110.

The second contactor 122 can be a 2-pole contactor, a 3-pole contactor, a 4-pole contactor, a 5-pole contactor, or a contactor having another suitable number of poles. The contactor 122 can be a double throw contactor, a triple throw contactor, a quadruple throw contactor, a quintuple throw contactor, or a contactor having another suitable number of throws. Alternatively, the remote-controlled disconnect switch 110 and/or other portions of the system 100 can include multiple single-pole and/or single throw contactors.

In a specific example, as shown in FIG. 2A, the second contactor 122 is a 2-pole, double throw contactor that has functionality for adjusting or transitioning between states of the relay/normally-closed contactor 120 circuit in two positions.

As shown in FIG. 2A, the remote-controlled disconnect switch 110 can include a communications relay 125, which enables remote access to the remote-controlled disconnect switch 110 (e.g., by a maintenance entity who/that is remote from the charger 10). The communications relay can be a controlled 120V relay that has functionality for a momentary hold for a duration of time. The duration of time can be 1 second, 2 seconds, 3 seconds, 4 seconds, 5 seconds, 6 seconds, 7 seconds, 8 seconds, 9 seconds, 10 seconds, 15 seconds, 20 seconds, 30 seconds, 40 seconds, 50 seconds, 60 seconds, an intermediate number of seconds, or another suitable duration of time.

In variations, the communications relay 125 can include WiFi network relay architecture. Additionally or alternatively, the communications relay 125 can include cellular network relay architecture, where the cellular network relay architecture can support transmissions over a 4G network, over a 5G network, over a 3G network, etc. Alternatively, the communications relay 125 can include network relay architecture for another type of network. In a specific example, the communications relay 125 includes at least cellular network relay architecture can support transmissions over a 4G network.

In variations, the communications relay 125 can include a number of inputs a number of outputs. in variations, the number of inputs can be from 1 to 10 (or greater), and the number of outputs can be from 1 to 10 (or greater). In a specific example, the communications relay 125 includes a single input and a single output.

For Wifi network relay architecture, the communications relay 125 can be structured for security protocols including one or more of: WPA3 (Wi-Fi Protected Access 3) for encryption, which provides robust security by encrypting data transmissions between devices and the router; WPA3-Enterprise, which uses the Extensible Authentication Protocol (EAP) to require users to provide valid credentials, such as usernames and passwords, before granting access; certificate-based authentication; and/or other protocols that enhance security by ensuring that only trusted devices can connect to the remote-controlled disconnect switch 110.

For cellular network relay architecture, the communications relay 125 can be structured for security protocols including one or more of: authentication and key Agreement (AKA) mechanism protocols (e.g., for GSM, 3G networks, 4G/LTE networks, and 5G networks), where AKA involves the exchange of unique keys and authentication tokens between the mobile device and the network's Home Location Register (HLR) or Authentication Center (AuC) to verify the device's identity before granting access; evolved AKA mechanism protocols for 5G networks, where the AKA mechanism provides greater security through features like fresher keys and improved protection against various attacks; encryption protocols such as the A5 series in older networks; encryption protocols for more-advanced LTE/5G encryption standards to protect data in transit; and/or other protocols that enhance security by ensuring that only trusted devices can connect to the remote-controlled disconnect switch 110.

2.2 System-Safety Subsystem and Manual Disconnect Switch

As shown in FIGS. 1 and 2A, embodiments, variations, and examples of the system 100 can include a safety subsystem 130 including a manual disconnect switch 132 coupled to the remote-controlled disconnect switch 110. The safety subsystem 130 can also include additional safety and/or authentication features, that prevent tampering or hacking of the system 100 and/or charger 10.

The manual disconnect switch 132 functions to enable a certified entity (e.g., technician, electrician, utility personnel, etc.) to safely lock out and tag the charger 10, if needed. The manual disconnect switch 132 also functions to provide a safe mechanism for disconnecting the charger 10 from power, if connections with the remote-controlled disconnect switch 110 through communications relay 125 are lost.

The manual disconnect switch 132 can be coupled to the remote-controlled disconnect switch 110 after the normally-closed contactor 120 described above, where a specific example is shown in FIG. 2A. As such, the manual disconnect switch 132 can be positioned between the remote-controlled disconnect switch 110 and the EVSE/charger/other apparatus. Alternatively, the manual disconnect switch can be positioned relative to and/or coupled to the normally-closed contactor 120 in another suitable manner.

The manual disconnect switch 132 can include an optional auxiliary contact that links to (e.g., wirelessly couples with, couples with in a wired manner) the communications relay 125, in order to indicate the position of the remote-controlled disconnect switch 110 (e.g., in relation to transitions to an off-state, in relation to transitions to an on-state, in relation to operation in a power cycling mode, etc.) and report this to a server associated with the platform for monitoring chargers/EVSE units. As such, the communications relay 125 can include architecture for detecting a set of positions of the manual disconnect switch and reporting a status pertaining to the set of positions (e.g., on-state position, off-state position, power cycling mode, etc.) to a remote server associated with a platform for monitoring the EVSE unit/apparatus/charger.

Additional safety or authentication features of the safety subsystem 130 can provide functionality for gating access to the manual disconnect switch 132 or other system portions (e.g., architecture of the remote-controlled disconnect switch 110). As such, the safety subsystem 130 can include a physical or electronic locking interface 133 that is openable with an unlocking device, or that can transition between a locked state and an unlocked state upon authentication of an approved entity.

The locking interface 133, an embodiment of which is shown in FIG. 1, can thus include mechanical and/or electrical locking mechanism components. In one variation, an electronic locking interface can include a pad (e.g., touch pad, key pad, etc.) responsive to touch input by a user, where input of a code (e.g., alphanumeric code, swipe pattern, etc.) transitions the system from a locked mode to an unlocked mode. In another related variation, the electronic locking interface can include an optical sensor and associated architecture for processing a biometric signature (e.g., fingerprint, thumbprint, facial feature, eye feature, etc.) of an entity (e.g., technician), where authentication based upon the biometric signature transitions locking interface from a locked mode to an unlocked mode. In another related variation, the electronic locking interface can include a microphone and associated architecture for processing a biometric signature (e.g., voice, etc.) of the user (e.g., technician), where authentication based upon the biometric signature transitions the locking interface from a locked mode to an unlocked mode. As such, the electronic locking interface can include a biometric sensor.

Additionally or alternatively, in another variation, the locking interface can be unlocked based upon communication (e.g., wireless communication) with an authenticated device, such as a fob, mobile computing device, wearable computing device, card, chip, and/or other computing device of an authenticated entity associated with system 100. In examples, objects/devices that can be uniquely identified with the user's account can include: employee badges, housing key fobs, hotel keys, other charging network RFID cards, credit cards (e.g., encrypted credit card information), wearable electronic devices (e.g., Apple™ wearable devices, Android™ wearable devices, etc.), and other objects.

Additional features of the safety subsystem 130 can include indicators of electrical states of the remote-controlled disconnect switch 110, manual disconnect switch 132, charger 10, and/or other apparatuses interfaced with the system 100, in order to prevent electrical shock to an entity accessing the manual disconnect switch 132 or other electrically live component associated with the system 100.

Other architecture of the safety subsystem 130 can include one or more of: ground fault circuit interrupters (GFCIs) that enable monitoring the flow of electricity and automatic shutting off of power upon detection of flow anomalies; circuit breakers; insulation and wiring damage detectors that ensure that characteristics of insulation and wiring adhere to electrical wiring standards and codes; residual current devices; ground detectors; other emergency shutoff systems; surge protectors; surge protection devices; and/or other electric shock protection systems.

2.3 System-Lines and Interfaces

As shown in FIGS. 1 and 2A, embodiments, variations, and examples of the system 100 can include a set of lines 140 coupling the remote-controlled disconnect switch 110 to an interface 170 and the manual disconnect switch 130 to the electric charger 10, where the lines 140 enable transmission of current between components of the system 100 and components interfaced with the system 100.

2.4 System-Housing and Indicators

As shown in FIGS. 1 and 2A, embodiments, variations, and examples of the system 100 can include an indication subsystem 150, which functions to indicate if electricity is being passed to the electric charger 10. The indication subsystem 150 can thus include architecture for detecting current flow to the electric charger 10 (e.g., through contact means, through non-contact means). In variations, the indication subsystem 150 can include a current sensor, where the current sensor can be an open-loop sensor, a closed-loop sensor, or a fluxgate sensor. In one example, the current sensor is a shunt resistor current sensor. In another example, the current sensor is a Hall effect current sensor, which employs the Hall effect phenomenon to detect the magnetic field generated by a current-carrying conductor. In another example, the current sensor can include one or more current transformers that include a primary winding to induce a current in a secondary winding. In another example, the current sensor is a current clamp/current probe, which can be clamped about a conductor to measure magnetic field and deduce current flowing through the conductor.

The indication subsystem 150 can then include an indicator (e.g., output device), such as a light output device, an audio output device, a vibration output device, a notification transmission device (e.g., configured to provide notifications through a user device, etc.), or other output device.

Optionally, embodiments, variations, and examples of the system 100 can include an enclosure/housing 160 for the remote-controlled disconnect switch 110, the manual disconnect switch 130, and the indication subsystem 150. The enclosure/housing 160 functions to contain and protect (e.g., environmentally protect) sensitive components of the system 100, and/or prevent undesired access to the system 100 through the locking interface(s) described.

The enclosure/housing 160 can be composed of a material having suitable mechanical properties. In variations, materials of the enclosure/housing 160 can be configured to provide suitable mechanical properties in relation to stresses attributed to mechanical forces applied to the system 100; stresses associated with impacts to the system 100 during use; stresses due to thermal expansion; stresses due to thermal contraction; and other associated stresses depending upon applications of use.

Additionally or alternatively, the enclosure/housing 160 can be composed of a material having suitable thermal properties. In variations, materials of the enclosure/housing 160 can be configured to provide suitable thermal properties in relation to one or more of: thermal conductivity, thermal expansion (e.g., in relation to having a desired level of thermal expansion); and other thermal properties depending upon application of use.

Additionally or alternatively, the enclosure/housing 160 can be composed of a material having suitable physical or surface properties. In variations, materials of the enclosure/housing 160 can be configured to provide suitable physical or surface properties in relation to one or more of: electrochemical properties (e.g., due to corrosive environments), electromagnetic properties (e.g., in relation to ultraviolet light exposure), and other surface or physical properties due to environment of use of the system 100.

The enclosure/housing 160 can also function to provide a seal about sensitive electronic and other components associated with the system 100. In variations, the seal can be a hermetic seal, a seal that allows passage of gasses but prevents passage of liquids, or another suitable type of seal. In these variations, the housing 150 can function as a seal, or can additionally or alternatively include sealing components (e.g., gaskets, o-rings, sealing compounds, etc.) at openings of the enclosure/housing 160, or between various sub-portions of the enclosure/housing 160.

The enclosure/housing 160 can provide an environmental protection rating of IP[0-6][0-9], and in a specific example, enclosure/housing 160 can provide an environmental protection rating of IP69K.

2.5 System-Additional Examples 2.5.1 System-Additional Example 1

Figure 2B:
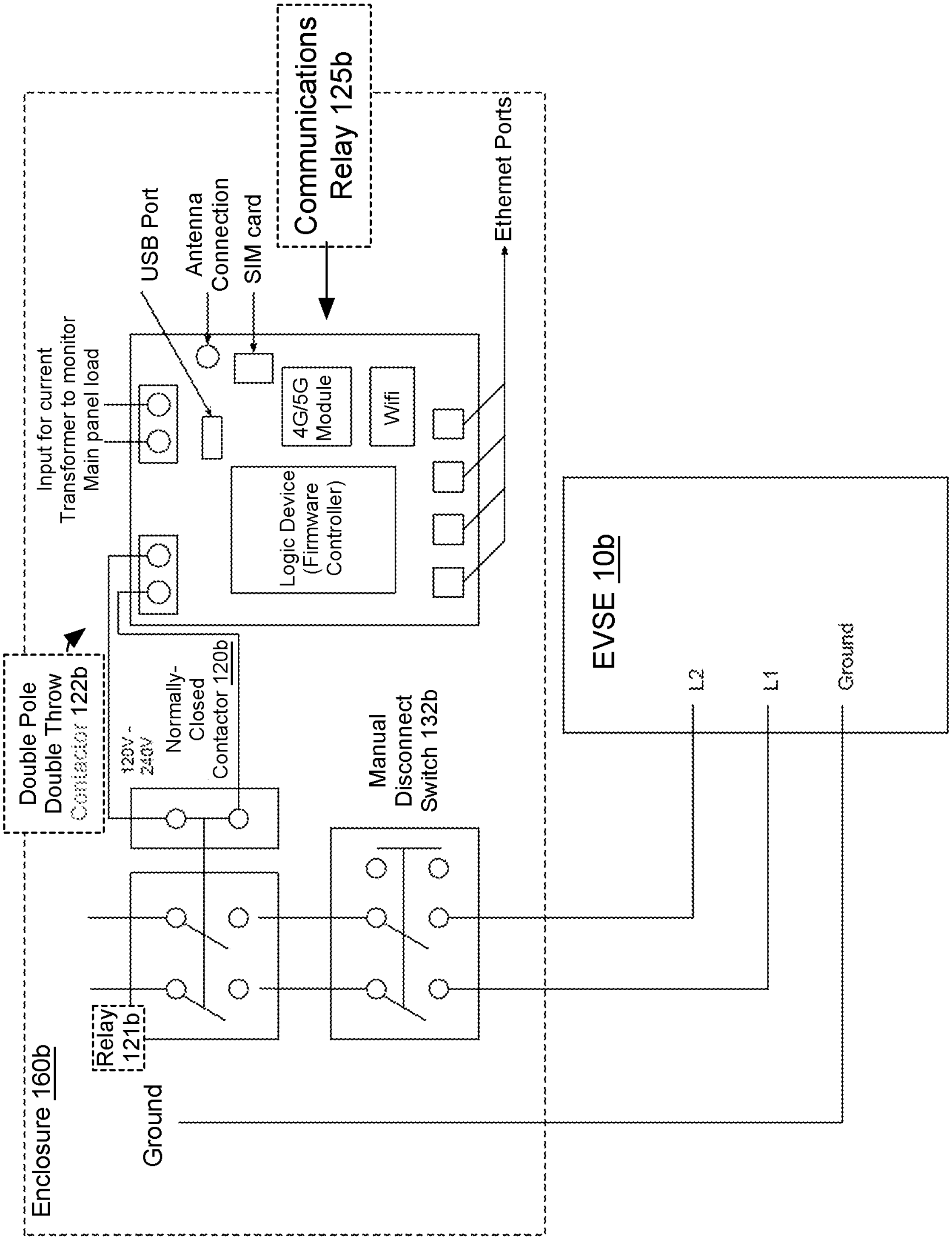
FIG. 2B depicts a second example of a system for remotely servicing a charger or other apparatus.

FIG. 2B depicts a second specific example of system embodiments and variations described. The second specific example includes a remote-controlled disconnect switch including a contactor **120*b* configured to prevent the electric charger 10*b* from losing power; a manual disconnect switch 132*b* coupled to the remote-controlled disconnect switch through relay 121*b*; a set of lines (including L1 and L2) coupling the remote-controlled disconnect switch and the manual disconnect switch 132*b* to the electric charger 10*b*; and an enclosure/housing 160*b* for the remote-controlled disconnect switch. In the specific example shown in FIG. 2B, the contactor 120*b* coupled to relay 121*b* is a 2-pole, double throw contactor that has functionality for adjusting or transitioning between states of the relay 121*b*/normally-closed contactor 120*b* circuit in two positions. The normally-closed contactor 120*b* can operate at 120V-240V. The 2-pole, double throw contactor is coupled to the communications relay 125*b* of the remote-controlled disconnect switch, where the communications relay 125*b* enables remote access to the remote-controlled disconnect switch (e.g., by a maintenance entity who/that is remote from the charger 10*b*). The communications relay 125*b* can be a controlled 120V relay that has functionality for a momentary hold for a duration of time. The exemplary communications relay 125*b* shown in FIG. 2B includes: an input for a current transformer to monitor load on a main panel associated with the remote disconnect switch, a universal serial bus (USB) port for a wired connection to the communications relay 125*b*, an antenna connection to the communications relay 125*b*, a 4G (and/or 5G) module for cellular communications with the communications relay 125*b***, WiFi network relay architecture, one or more ethernet ports for local area network connections, and a logic device that can operate as a firmware controller. The logic device can be a programmable logic device (or similar device) that controls the firmware for the devices involved (e.g., communications relay devices, switch devices, etc.). The logic device can be internally capable of open charge point protocol (OCPP) as a uniform solution for communications. Additionally or alternatively, the logic device can be capable of other communication protocols (e.g., IEC 63110, ISO 15118, OCPI, etc.). The logic device can thus allow for communications across different modalities (e.g., wired modalities, wireless modalities, etc.) according to universal and/or non-universal communication protocols.

For wireless network relay architecture, the communications relay 125*b* can be structured for security protocols including one or more of: WPA3 (Wi-Fi Protected Access 3) for encryption, which provides robust security by encrypting data transmissions between devices and the router; WPA3-Enterprise, which uses the Extensible Authentication Protocol (EAP) to require users to provide valid credentials, such as usernames and passwords, before granting access; certificate-based authentication; and/or other protocols that enhance security by ensuring that only trusted devices can connect to the remote-controlled disconnect switch.

For cellular network relay architecture, the communications relay 125*b* can be structured for security protocols including one or more of: authentication and key Agreement (AKA) mechanism protocols (e.g., for GSM, 3G, and 4G/LTE networks), where AKA involves the exchange of unique keys and authentication tokens between the mobile device and the network's Home Location Register (HLR) or Authentication Center (AuC) to verify the device's identity before granting access; evolved AKA mechanism protocols for 5G networks, where the AKA mechanism provides greater security through features like fresher keys and improved protection against various attacks; encryption protocols such as the A5 series in older networks; encryption protocols for more-advanced LTE/5G encryption standards to protect data in transit; and/or other protocols that enhance security by ensuring that only trusted devices can connect to the remote-controlled disconnect switch.

2.5.1 System-Additional Example 2

Figure 2C:
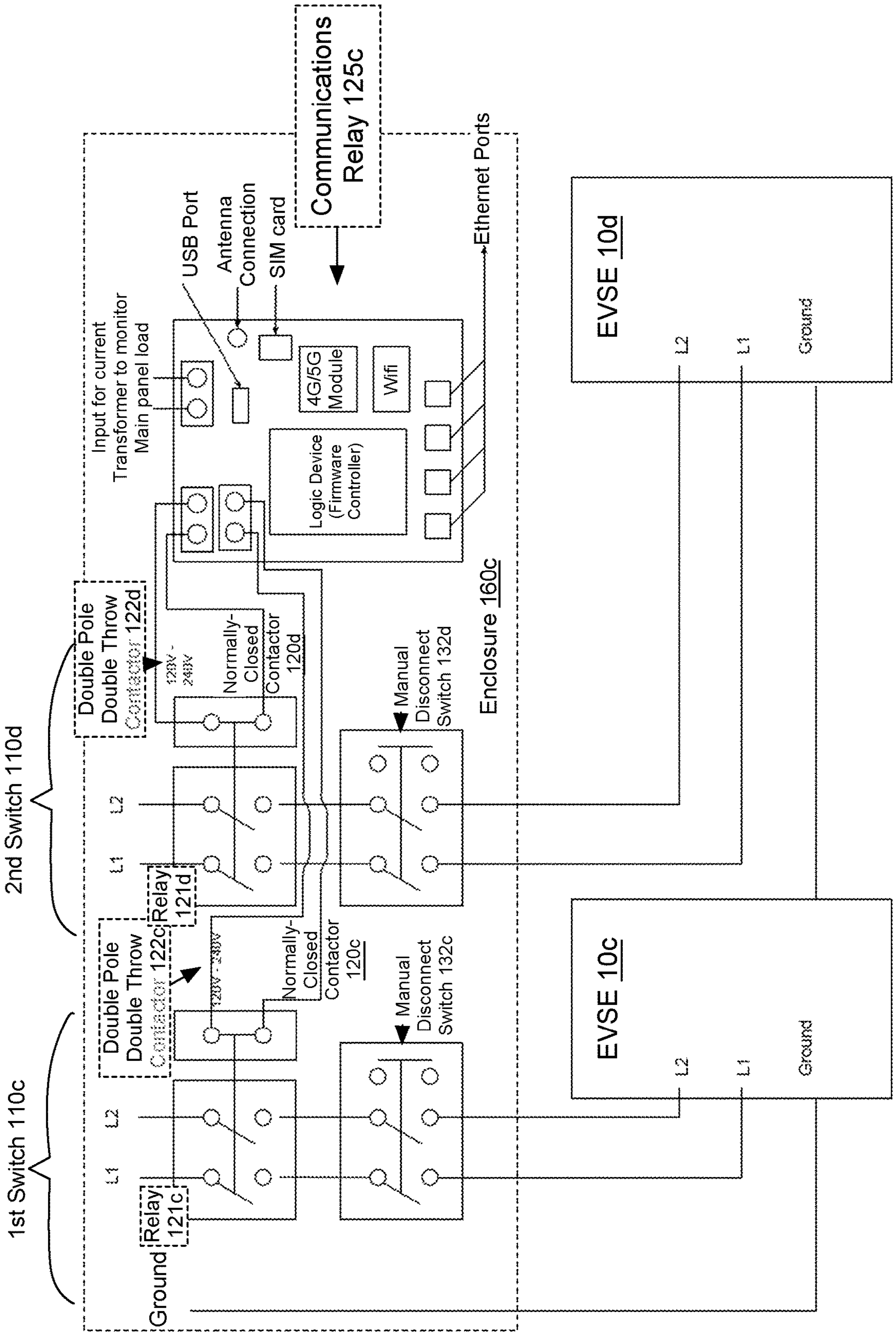
FIG. 2C depicts a third example of a system for remotely servicing a charger or other apparatus.

FIG. 2C depicts a third specific example of system embodiments and variations described, where the third specific example can support remote access to and/or servicing of multiple EVSE units. The third specific example includes a first remote-controlled disconnect switch 110*c* including a contactor 120*c* configured to prevent the electric charger 10*c* from losing power; a manual disconnect switch 132*c* coupled to the first remote-controlled disconnect switch through relay 121*c*; a set of lines (including L1 and L2) coupling the first remote-controlled disconnect switch 110*c* and the manual disconnect switch 132*c* to the first electric charger 10*c*; and an enclosure/housing 160*c* for the first remote-controlled disconnect switch 110*c*. In the specific example shown in FIG. 2C, the contactor 120*c* coupled to relay 121*c* is a 2-pole, double throw contactor 122*c* that has functionality for adjusting or transitioning between states of the relay 121*c*/normally-closed contactor 120*c* circuit in two positions. The normally-closed contactor 120*c* can operate at 120V-240V.

The third specific example shown in FIG. 2C also includes a second remote-controlled disconnect switch 110*d* including a contactor 120*d* configured to prevent the electric charger 10*d* from unnecessarily losing power; a manual disconnect switch 132*d* coupled to the second remote-controlled disconnect switch 110*d* through relay 121*d*; a set of lines (including L1 and L2) coupling the second remote-controlled disconnect switch 110*d* and the manual disconnect switch 132*d* to the second electric charger 10*d*; and an enclosure/housing 160*c*. The housing 160 can be the same housing surrounding the first remote controlled disconnect switch 110*c*, or can be a separate housing (e.g., a second housing dedicated to the second remote controlled disconnect switch 110*d*). In the specific example shown in FIG. 2C, the contactor 120*d* coupled to relay 121*d* is a 2-pole, double throw contactor 122*d* that has functionality for adjusting or transitioning between states of the relay 121*d*/normally-closed contactor 120*c* circuit in two positions. The normally-closed contactor 120*d* can operate at 120V-240V.

The 2-pole, double throw contactors 1220, 122*d* are coupled to the communications relay 125*c*, where the communications relay 125*c* enables remote access to the first remote-controlled disconnect switch (e.g., by a maintenance entity who/that is remote from the charger 10*c*). The communications relay 125*c* can be a controlled 120V relay that has functionality for a momentary hold for a duration of time. The exemplary communications relay 125*c* shown in FIG. 2C includes: an input for a current transformer to monitor load on a main panel associated with the remote disconnect switch, a universal serial bus (USB) port for a wired connection to the communications relay 125*c*, an antenna connection to the communications relay 125*c*, a 4G (and/or 5G) module for cellular communications with the communications relay 125*b*, WiFi network relay architecture, one or more ethernet ports for local area network connections, and a logic device that can operate as a firmware controller. The logic device can be a programmable logic device (or similar device) that controls the firmware for the devices involved (e.g., communications relay devices, switch devices, etc.). The logic device can be internally capable of open charge point protocol (OCPP) as a uniform solution for communications. Additionally or alternatively, the logic device can be capable of other communication protocols (e.g., IEC 63110, ISO 15118, OCPI, etc.). The logic device can thus allow for communications across different modalities (e.g., wired modalities, wireless modalities, etc.) according to universal and/or non-universal communication protocols.

The communications relay 130, with programmable logic device, can include architecture for communications with and control of the individual remote controlled disconnect switches 110*c*, 110*d*, in a secure manner. As such, communication with and control of the individual remote controlled disconnect switches 110*c*, 110*d* can be performed individually (e.g., with individual commands) and/or jointly (e.g., with joint commands for controlling all switches coupled to the communications relay 125*c*).

For wireless network relay architecture, the communications relay 125*b* can be structured for security protocols including one or more of: WPA3 (Wi-Fi Protected Access 3) for encryption, which provides robust security by encrypting data transmissions between devices and the router; WPA3-Enterprise, which uses the Extensible Authentication Protocol (EAP) to require users to provide valid credentials, such as usernames and passwords, before granting access; certificate-based authentication; and/or other protocols that enhance security by ensuring that only trusted devices can connect to the remote-controlled disconnect switches 110*c*, 110*d*.

For cellular network relay architecture, the communications relay 125*b* can be structured for security protocols including one or more of: authentication and key Agreement (AKA) mechanism protocols (e.g., for GSM, 3G, and 4G/LTE networks), where AKA involves the exchange of unique keys and authentication tokens between the mobile device and the network's Home Location Register (HLR) or Authentication Center (AuC) to verify the device's identity before granting access; evolved AKA mechanism protocols for 5G networks, where the AKA mechanism provides greater security through features like fresher keys and improved protection against various attacks; encryption protocols such as the A5 series in older networks; encryption protocols for more-advanced LTE/5G encryption standards to protect data in transit; and/or other protocols that enhance security by ensuring that only trusted devices can connect to the remote-controlled disconnect switches 110*c*, 110*d*.

While the example shown in FIG. 2C depicts two remote-controlled disconnect switches 110*c*, 110*d*, the systems described can be expanded to include embodiments with 3 remote-controlled switch/EVSE pairs, 4 remote-controlled switch/EVSE pairs, 5 remote-controlled switch/EVSE pairs, 6 remote-controlled switch/EVSE pairs, 7 remote-controlled switch/EVSE pairs, 8 remote-controlled switch/EVSE pairs, 9 remote-controlled switch/EVSE pairs, 10 remote-controlled switch/EVSE pairs, 20 remote-controlled switch/EVSE pairs, 30 remote-controlled switch/EVSE pairs, or greater than 0 remote-controlled switch/EVSE pairs. In embodiments with multiple remote-controlled switch/EVSE pairs, the multiple remote-controlled switch/EVSE pairs can be coupled to the same communications relay, or can alternatively be coupled to a set of communications relay (e.g., in a 1:1 manner, in a non-1:1 manner).

2.6 System—EVSE/Charger

As indicated above, the system 100 is configured to support proper operation and/or determination of statuses of a charger 10/EVSE.

EVSEs can include any suitable types of EVSEs. Types of EVSEs can differ based on appearance; access method (e.g., RFID; network account via application such as mobile application; credit card module; plugin without authentication; etc.); charging speed (e.g., level 1/L1, which can generally be residential or commercial, and/or can include a regular wall outlet such as one providing 120V, AC, adding around 5 miles/hour of charging for plugin hybrids; level 2/L2, which can generally be residential or commercial, and/or can provide 220V-240V, AC, power varying from 6.6 kW to 20 kW, adding around 20 miles or more/hour of charging; level 3/L3, which can generally be commercial or public, and/or can be DC, power of 25 kW or above; etc.); corresponding network operator; corresponding hardware original equipment manufacturer (OEM); and/or other suitable features.

Different types of EVSEs can include and/or be associated with same or different types of EVSE reservation parameters, and/or same or different values for types of EVSE reservation parameters. For example, EVSEs with higher power (e.g., 25 kW and above; etc.) can be associated with shorter maximum session duration parameters compared to EVSEs with lower power. In a specific example, a L3 EVSE can be associated with a maximum session duration of 45 minutes or less. In a specific example, a L2 EVSE can be associated with a maximum session duration from 2 hours to 4 hours. In examples, shorter maximum session durations can encourage higher turnover, but maximum session durations that are too short can lead to poor user experiences. However, any suitable EVSEs can include and/or be associated with any suitable EVSE reservation parameters.

Alternatively, the charger/EVSE unit 10 can charge other systems/conveyances (e.g., electric/hybrid aerial vehicles, electric/hybrid watercraft, other devices). Alternatively, the system 100 can be configured to provide a remote disconnect switch for another type of electrical apparatus, in relation to utility system components for generating, transmitting, and/or storing energy.

3. METHOD

Figure 3:
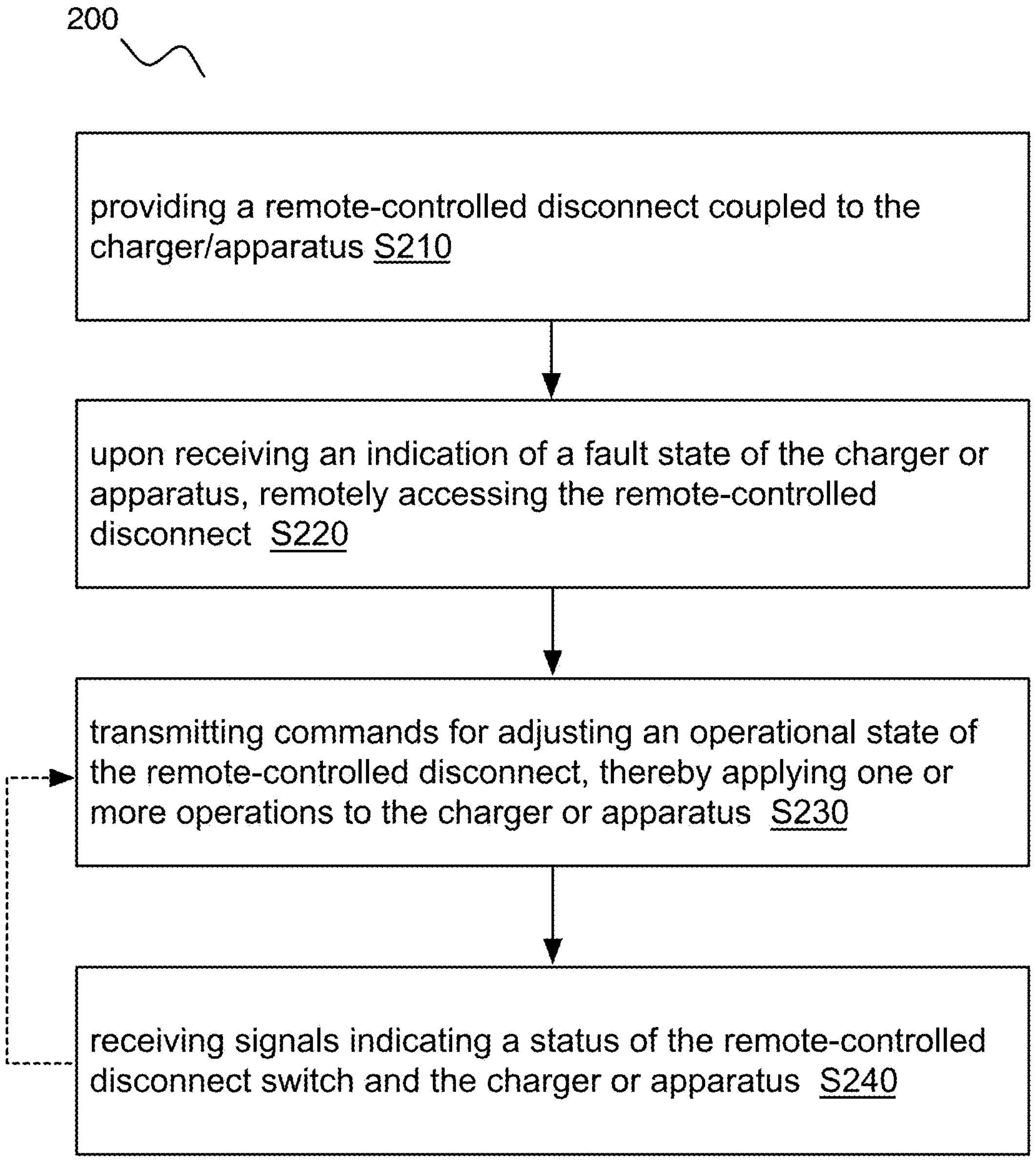
FIG. 3 depict a flowchart of a method for remotely servicing a charger or other apparatus.

As shown in FIG. 3, a method 200 for addressing a fault state of a charger (e.g., EVSE) or other apparatus includes: providing a remote-controlled disconnect switch coupled to a manual disconnect switch, positioned electrically ahead of the charger or apparatus S210; upon receiving an indication of a fault state of the charger or apparatus, remotely accessing the remote-controlled disconnect switch S220 from a position away from the charger or apparatus; transmitting commands for adjusting an operational state of the remote-controlled disconnect switch, thereby applying one or more operations to the charger or apparatus S230; and receiving signals encoding/indicating a status of at least one of the remote-controlled disconnect switch, the charger, and the apparatus S240.

The method 200 functions to provide a safe and secure mechanism for remotely communicating with, accessing, manipulating, testing, servicing, and/or modulating operation of an associated charger/EVSE unit. The method 200 thus provides a mechanism for reducing, minimizing, or otherwise eliminating downtime for an associated charger/EVSE unit, in order to rapidly address issues for users, in relation to hardware faults, software faults, internet connectivity issues, and/or other issues involved in a charging session, in compliance with code and regulatory requirements for charging systems, including electric vehicle chargers.

Embodiments, variations, and examples of the method 200 can be executed using embodiments, variations, and examples of the system 100 described in Section 2 above. Variations of the method 200 can be applied to remote access and manipulation of operational states of other electrical apparatus, without need for on-site maintenance personnel (e.g., at the physical location of the electrical apparatus).

Step S210 recites: providing a remote-controlled disconnect switch coupled to a manual disconnect switch, positioned electrically ahead of the charger or apparatus, which functions to provide a physical solution to remotely accessing, in a safe manner, systems for controlling power to the charger. Step S210 can include providing an embodiment, variation, or example of the remote-controlled disconnect switch with manual disconnect switch described in Section 2 above. Alternatively, step S210 can include providing a modified version of the remote-controlled disconnect switch.

Step S220 recites: upon receiving an indication of a fault state of the charger or apparatus, remotely accessing the remote-controlled disconnect switch. Step S220 functions to enable prompt responses to indicated fault states of the charger or apparatus, without requiring presence of an on-site maintenance personnel. Variations of Step S220 can include remotely accessing the remote-controlled disconnect switch through a communications relay (e.g., the communications relay described in Section 2 above), with configurations for transmissions over a cellular network and/or a WiFi Network, according to security protocols.

In variations, Step S220 can include providing a remote connector control tool of a platform for detecting statuses of and maintaining operation of a set of chargers (EVSE units) or other electrical apparatus. The remote connector control tool can include architecture for responding to inputs provided by a user or other entity, and can return information indicating statuses of the charger or other apparatus, as well as connection states (e.g., on-line connection states, off-line connection states) with the remote-controlled disconnect switch.

Step S220 may not always be performed in response to an indicated fault state of the charger or apparatus. For instance, variations of Step S220 can be performed as part of routine testing and/or prior to initial operation of the charger or apparatus. Additionally or alternatively, variations of Step S220 can include detecting a usage state of the EVSE unit/charger/apparatus (e.g., determining if the EVSE unit/charger/apparatus is being used, determining if the EVSE unit/charger/apparatus is not being used, determining if the EVSE unit/charger/apparatus is subject to a duration of not being used between scheduled and/or ad hoc charging sessions, etc.), and remotely accessing the remote-controlled disconnect switch upon determining that the EVSE unit/charger/apparatus is not being used. As such, S220 can further remotely accessing the remote-controlled disconnect switch upon determining, from signals transmitted from the communications relay, that the EVSE unit is in between charging sessions of a set of charging sessions; and testing operation of the EVSE upon transmission of commands to the EVSE through the communications relay.

Step S230 recites: transmitting commands for adjusting an operational state of the remote-controlled disconnect switch, thereby applying one or more operations to the charger or apparatus. Step S230 functions to access, manipulate, test, service, and/or modulate operation of the charger or apparatus. In variations, upon detection of a fault state of the charger or apparatus, Step S230 can enable prompt and/or real-time troubleshooting of the fault state, without requiring on-site maintenance personnel.

In one example, transmitting commands for adjusting an operational state of the remote-controlled disconnect switch can include transmitting commands through the communication relay (e.g., 4G relay, WiFi relay, other relay) to power cycle the charger or apparatus, by adjusting selected pole/throw configurations of a contactor of the remote-controlled disconnect switch.

In relation to transmitting commands for power cycling, the method 200 can include automatically re-energizing the charger or apparatus (e.g., returning the charger or apparatus to a powered state) after a duration of time, in order to reduce downtime for the charger or apparatus. In examples, the duration of time can be 1 minute, 2 minutes, 3 minutes, 4 minutes, 5 minutes, 10 minutes, 15 minutes, 20 minutes, an intermediate duration of time, or a greater duration of time. Re-energizing the charger or apparatus can include verifying that the charger or apparatus has satisfied testing requirements, as determined through signals transmitted from the EVSE unit, through the communications relay, and to a server associated with a platform for monitoring the EVSE unit.

Step S240 recites: receiving signals indicating a status of the remote-controlled disconnect switch and the charger or apparatus, in coordination with transmitting commands according to Step S230, and/or after adjusting operation states of the charger or apparatus in Step S230. Step S240 functions to enable real-time or near real-time responses to adjusted charger or apparatus statuses, in order to enable determination, remotely, if troubleshooting operations are successful or unsuccessful.

Signals can be provided visually (e.g., with light output devices or displays), auditorily (e.g., using sound output devices), haptically, or in another suitable manner. As such, Step S240 can include indicating, using an indication subsystem comprising a current sensor and an indication output device in communication with the remote-controlled disconnect switch and the manual disconnect switch, the status of at least one of the remote-controlled disconnect switch and the EVSE unit.

Exemplary signals can indicate statuses of hardware in various states, such as a "preparing state" (e.g., preparing for remote access), a "charging state", a disconnected state, a reconnected state, a fail state according to a set of checks, a pass state according to a set of checks, an off state, an on state or other states. Exemplary signals can additionally or alternatively indicate meter states associated with powering of the charger or apparatus.

As shown in FIG. 3, portions of the method 200 can be performed repeatedly (e.g., within a loop), until the status of the charger or apparatus is satisfactory.

Additional method steps can include: further comprising permitting access to the manual disconnect switch upon authentication of an approved entity attempting to access the manual disconnect switch, wherein permitting access comprises transitioning an electronic locking interface, gating access to the manual disconnect switch, between a locked state and an unlocked state.

3.1 Example

An example of method 200 can be adapted for power cycling a charger or other apparatus, where steps of the method 200 include:

1. Providing tools and hardware for remotely accessing a remote-controlled disconnect switch coupled to the charger or apparatus, including with a Log Viewer of a platform, a remote connector control module, and a management application for a set of chargers or apparatus being maintained by an entity (e.g., community manager). The community manager can be accessed and be structured to receive commands for selection of a test location associated with the charger or apparatus.
2. Performing a testing procedure, where the testing procedure can involve:
   - a. Connecting a load using the remote connector control module
   - b. Confirming that the associated charger or apparatus is in "Preparing" state upon receiving status signals from the associated charger or apparatus
   - c. Performing remote initiation of operations with the community manager management application
   - d. Confirming that the associated charger or apparatus is in "Charging" state upon receiving status signals from the associated charger or apparatus
   - e. Receiving at least one meter value for a meter associated with the charger or other apparatus
   - f. Pausing transactions, remotely, with the community manager management application. As such, the example method can include performing a power cycling operation for the EVSE unit, through commands transmitted through the communications relay; and pausing acceptance of financial transactions associated with intended charging sessions involving the EVSE unit, during performance of the power cycling operation. Pausing acceptance of financial transactions associated with intended charging sessions can further include pausing acceptance of financial transactions during other states in which the EVSE unit is unable to perform charging operations suitably.

g. Power cycling the charger or apparatus with the remote-controlled disconnect switch h. Waiting for the charger or apparatus to reconnect i. Determining if the charger or apparatus has passed or failed the remote power cycling operation based on:

Fail: charger or apparatus does not reconnect, charger or apparatus does not reset or send a Boot Notification, and/or charger or apparatus resets but does not return to "preparing" state Pass: charger or apparatus reboots and sends a BootNotification, charger or apparatus returns to "preparing" state Variations of the example can be adapted to remotely perform other suitable testing or troubleshooting operations.

4. COMPUTING SYSTEMS

Figure 4:
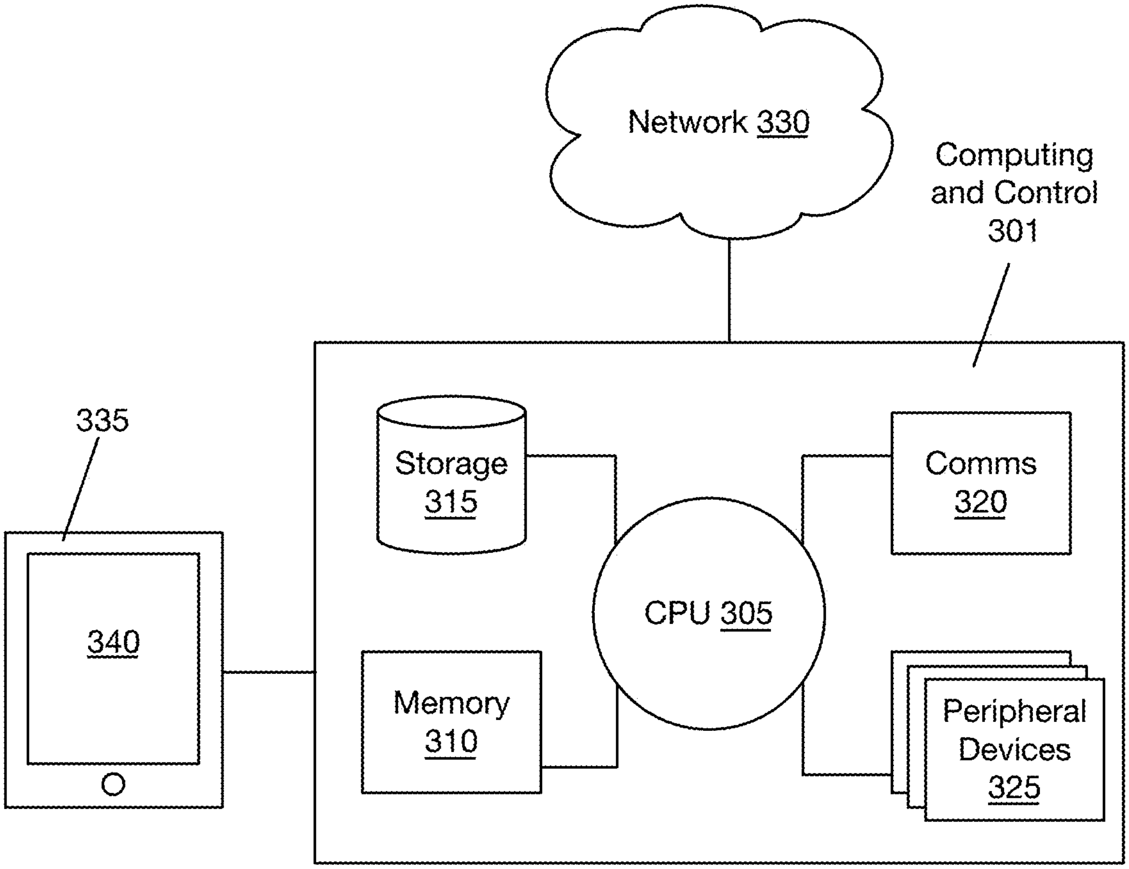
FIG. 4 depicts an embodiment of a computer system involved in executing a method for remotely servicing a charger or other apparatus.

The present disclosure provides computing and control subsystems that are programmed to implement methods described. FIG. 4 shows a computing and control subsystem 301 that is programmed or otherwise configured to, for example, facilitate charging of an electric vehicle, according to methods described.

The computing and control subsystem 301 includes architecture for regulating various aspects of remotely accessing and testing a charger or apparatus, according to functionalities of the present disclosure described. The computing and control subsystem 301 can be an electronic device of a user or a computer system that is remotely located with respect to the electronic device. The electronic device can be a mobile electronic device.

The computing and control subsystem 301 includes a central processing unit (CPU, also "processor" and "computer processor" herein) 305, which can be a single core or multi core processor, or a plurality of processors for parallel processing. The computing and control subsystem 301 also includes memory or memory location 310 (e.g., random-access memory, read-only memory, flash memory), electronic storage unit 315 (e.g., hard disk), communication interface 320 (e.g., network adapter) for communicating with one or more other systems, and peripheral devices 325, such as cache, other memory, data storage and/or electronic display adapters. The memory 310, storage unit 315, interface 320 and peripheral devices 325 are in communication with the CPU 305 through a communication bus (solid lines), such as a motherboard. The storage unit 315 can be a data storage unit (or data repository) for storing data. The computer system 301 can be operatively coupled to a computer network ("network") 330 with the aid of the communication interface 320. The network 330 can be the Internet, an internet and/or extranet, or an intranet and/or extranet that is in communication with the Internet.

In some embodiments, the network 330 is a telecommunication and/or data network. The network 330 can include one or more computer servers, which can enable distributed computing, such as cloud computing. For example, one or more computer servers may enable cloud computing over the network 330 ("the cloud") to perform various aspects of facilitating charging of an electric vehicle, with desired security, authentication, and locking functionalities associated with various types of charging sessions and/or different users. Such cloud computing may be provided by cloud computing platforms such as, for example, Amazon Web Services (AWS), Microsoft Azure, Google Cloud Platform, and IBM cloud. In some embodiments, the network 830, with the aid of the computing and control system 301, can implement a peer-to-peer network, which may enable devices coupled to the computing and control system 301 to behave as a client or a server.

The CPU 305 can include one or more computer processors and/or one or more graphics processing units (GPUs). The CPU 305 can execute a sequence of machine-readable instructions stored in a non-transitory medium, which can be embodied in a program or software. The machine-readable instructions, when executed, can perform one or more steps of the method(s) described. The instructions may be stored in a memory location, such as the memory 310. The instructions can be directed to the CPU 305, which can subsequently program or otherwise configure the CPU 305 to implement methods of the present disclosure. Examples of operations performed by the CPU 305 can include fetch, decode, execute, and writeback. The CPU 305 can be part of a circuit, such as an integrated circuit. One or more other components of the computing and control subsystem 301 can be included in the circuit. In some embodiments, the circuit is an application specific integrated circuit (ASIC).

The storage unit 315 can store files, such as drivers, libraries and saved programs. The storage unit 315 can store user data, e.g., user preferences and user programs. In some embodiments, the computer system 301 can include one or more additional data storage units that are external to the computer system 301, such as located on a remote server that is in communication with the computing and control system 301 through an intranet or the Internet.

The computing and control subsystem 301 can communicate with one or more remote computer systems through the network 330. For instance, the computer system 601 can communicate with a remote computer system of a user. Examples of remote computer systems include personal computers (e.g., portable PC), slate or tablet PC's (e.g., Apple® iPad, Samsung Galaxy Tab), telephones, Smart phones (e.g., Apple® iPhone, Android-enabled device, Blackberry®), smart watches, or personal digital assistants. The user can access the computing and control system via the network 330.

Methods as described herein can be implemented by way of machine (e.g., computer processor) executable code stored on an electronic storage location of the computing and control subsystem 301, such as, for example, on the memory 310 or electronic storage unit 315. The machine executable or machine-readable code can be provided in the form of software. During use, the code can be executed by the processor 305. In some embodiments, the code can be retrieved from the storage unit 315 and stored on the memory 310 for ready access by the processor 305. In some situations, the electronic storage unit 315 can be precluded, and machine-executable instructions are stored on memory 310.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Embodiments of the systems and methods provided herein, such as the computing and control subsystem 301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, or disk drives, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computing and control subsystem 301 can include or be in communication with an electronic display 335 that comprises a user interface (UI) 340 for providing, for example, a visual display indicative of statuses associated with charging of an electric vehicle, security information, verification information, and other information. Examples of UIs include, without limitation, a graphical user interface (GUI) and web-based user interface.

Methods and systems of the present disclosure can be implemented by way of one or more algorithms. An algorithm can be implemented by way of software upon execution by the central processing unit 305. The algorithm can, for example, facilitate charging of an electric vehicle, with desired security, verification, and other functionalities associated with various types of charging sessions and/or different users.

Additionally or alternatively, the computing and control subsystem 301 can include architecture with programming to execute other suitable methods.

5. CONCLUSION

Embodiments of the invention(s) described can include every combination and permutation of the various system components and the various method processes, including any variants (e.g., embodiments, variations, examples, specific examples, figures, etc.), where portions of embodiments of the method 100 and/or processes described herein can be performed asynchronously (e.g., sequentially), concurrently (e.g., in parallel), or in any other suitable order by and/or using one or more instances, elements, components of, and/or other aspects of the system 200 and/or other entities described herein.

Any of the variants described herein (e.g., embodiments, variations, examples, specific examples, figures, etc.) and/or any portion of the variants described herein can be additionally or alternatively combined, aggregated, excluded, used, performed serially, performed in parallel, and/or otherwise applied.

Portions of embodiments of the invention(s) can be embodied and/or implemented at least in part as a machine configured to receive a computer-readable medium storing computer-readable instructions. The instructions can be executed by computer-executable components that can be integrated with embodiments of the system(s). The computer-readable medium can be stored on any suitable computer-readable media such as RAMs, ROMs, flash memory, EEPROMs, optical devices (CD or DVD), hard drives, floppy drives, or any suitable device. The computer-executable component can be a general or application specific processor, but any suitable dedicated hardware or hardware/firmware combination device can alternatively or additionally execute the instructions.

As a person skilled in the art will recognize from the previous detailed description and from the figures and claims, modifications and changes can be made to embodiments of the inventions, and/or variants without departing from the scope defined in the claims. Variants described herein not meant to be restrictive. Certain features included in the drawings may be exaggerated in size, and other features may be omitted for clarity and should not be restrictive. The figures are not necessarily to scale. The absolute or relative dimensions or proportions may vary. Section titles herein are used for organizational convenience and are not meant to be restrictive. The description of any variant is not necessarily limited to any section of this specification.

Furthermore, it should be understood from the foregoing that, while particular implementations have been illustrated and described, various modifications may be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

We claim:

1. A system for remotely servicing an electric vehicle supply equipment (EVSE) unit, the system comprising:
  a remote-controlled disconnect switch comprising a communications relay coupled to a first contactor;
  a safety subsystem comprising a manual disconnect switch coupled to the remote-controlled disconnect switch;
  a set of lines coupling the remote-controlled disconnect switch to an interface and the manual disconnect switch to the EVSE unit; and
  a computing system comprising machine-readable instructions stored in a non-transitory medium, that when executed, perform in sequence the steps of:
    receiving an indication of a fault state of the EVSE unit,
    remotely accessing the remote-controlled disconnect switch from a position away from the EVSE unit,
    transmitting commands for adjusting an operational state of the remote-controlled disconnect switch, thereby applying a set of operations to the EVSE unit; and
    receiving signals indicating a status of at least one of the remote-controlled disconnect switch and the EVSE unit.

2. The system of claim 1, wherein the first contactor comprises a normally-closed contactor that is configured to return from an open state to a closed state in response to interrupted connections with the remote-controlled disconnect switch.

3. The system of claim 1, wherein the first contactor is coupled to a multi-pole and multi-throw contactor that provides control of the remote-controlled disconnect switch between a low voltage circuit and a high voltage circuit.

4. The system of claim 1, wherein the communications relay of the remote-controlled disconnect switch comprises WiFi wireless network relay architecture and cellular network relay architecture.

5. The system of claim 1, wherein the manual disconnect switch is positioned between the remote-controlled disconnect switch and the EVSE unit.

6. The system of claim 1, wherein the manual disconnect switch comprises an auxiliary link to the relay.

7. The system of claim 6, wherein the communications relay comprises architecture for detecting a set of positions of the manual disconnect switch and reporting a status pertaining to the set of positions to a remote server associated with a platform for monitoring the EVSE unit.

8. The system of claim 7, wherein the set of positions comprises an on-state position, an off-state position, and a power cycling mode.

9. The system of claim 1, wherein the safety subsystem comprises an electronic locking interface configured to transition between a locked state and an unlocked state upon authentication of an approved entity attempting to access the manual disconnect switch.

10. The system of claim 9, wherein the electronic locking interface comprises a biometric sensor.

11. The system of claim 1, further comprising a housing for the remote-controlled disconnect switch, the manual disconnect switch, and an indication subsystem.

12. The system of claim 11, wherein the indication subsystem comprises a current sensor and an indication output device.

13. The system of claim 1, wherein the EVSE comprises at least one of a level 1 EVSE, a level 2 EVSE, and a level 3 EVSE.

14. A method comprising:
  providing a remote-controlled disconnect switch coupled to a manual disconnect switch positioned between the remote-controlled disconnect switch and an electric vehicle supply equipment (EVSE) unit, the remote-controlled disconnect switch comprising a communications relay;
  upon receiving an indication of a fault state of the EVSE unit, remotely accessing the remote-controlled disconnect switch from a position away from the EVSE unit;
  after receiving the indication of the fault state, transmitting commands for adjusting an operational state of the remote-controlled disconnect switch, thereby applying one or more operations to the EVSE unit; and
  after applying one or more operations, receiving signals, from the communications relay, said signals encoding a status of at least one of the remote-controlled disconnect switch and the EVSE unit.

15. The method of claim 14, further comprising:
  remotely accessing the remote-controlled disconnect switch upon determining, from signals transmitted from the communications relay, that the EVSE unit is in between charging sessions of a set of charging sessions, and testing operation of the EVSE unit upon transmission of commands to the EVSE unit through the communications relay.

16. The method of claim 14, wherein the remote-controlled disconnect switch comprises a remote-controlled disconnect switch comprises a multi-pole and multi-throw contactor, and wherein transmitting commands for adjusting the operational state of the remote-controlled disconnect switch comprises modulating a pole and throw configuration of the multi-pole and multi-throw contactor.

17. The method of claim 14, wherein transmitting commands for adjusting the operational state of the remote-controlled disconnect switch comprises power cycling the EVSE unit, followed by re-energizing the EVSE unit after a duration of time.

18. The method of claim 14, further comprising:
  indicating, using an indication subsystem comprising a current sensor and an indication output device in communication with the remote-controlled disconnect switch and the manual disconnect switch, the status of at least one of the remote-controlled disconnect switch and the EVSE unit.

19. The method of claim 14, further comprising permitting access to the manual disconnect switch upon authentication of an approved entity attempting to access the manual disconnect switch, wherein permitting access comprises transitioning an electronic locking interface, gating access to the manual disconnect switch, between a locked state and an unlocked state.

20. The method of claim 14, wherein transmitting commands for adjusting the operational state of the remote-controlled disconnect switch comprises:
  performing a power cycling operation for the EVSE unit, through commands transmitted through the communications relay; and pausing acceptance of financial transactions associated with intended charging sessions involving the EVSE unit, during performance of the power cycling operation.

* * * * *